DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 8, 1970

878 O.G. 241

T878,011

PHOTOGRAPHIC PAPER

Louis G. Loquifer, Brussels, Belgium, and Lesley Hinds, Welwyn Garden City, England, assignors to Imperial Chemical Industries Limited, London, England, a corporation of Great Britain

Filed Mar. 11, 1970, Ser. No. 18,708

Claims priority, application Great Britain, Mar. 14, 1969, 13,575/69

Int. Cl. B32b *23/08*

U.S. Cl. 117—68

No Drawing. 5 Pages Specification

A photographic paper is disclosed having a paper base coated on at least one side with a 4-methylpentene-1 polymer, the emulsions are then applied to the coating of 4-methylpentene-1 polymer. Photographic papers thus produced have a reduced drying time and are heat stable when subjected to drying temperatures. It is preferred that both sides of the paper be coated with the 4-methylpentene-1 polymer.

The method of making a photographic paper with reduced drying time comprises coating at least one side (preferably both sides) of the paper with 4-methylpentene-1 polymer to a thickness of the order of about 20 to 25 microns, subjecting a 4-methylpentene-1 layer to surface treatment such as corona discharge to promote the adhesion of the emulsion of the polymer, placing an initial layer of gelatin on the polymer layer thus treated and applying a layer of radiation sensitive material such as a photographic emulsion to the prepared polymer layer. Papers thus produced are suitable for both black and white and color photography.